US012641702B2

(12) United States Patent
Bharmal et al.

(10) Patent No.: US 12,641,702 B2
(45) Date of Patent: May 26, 2026

(54) WIRELESS LIGHT SWITCH TO CONTROL A MESH NETWORK OF LIGHT DEVICES IN HAZARDOUS ENVIRONMENTS

(71) Applicant: Eaton Intelligent Power Limited, Dublin (IE)

(72) Inventors: Muhammedali A. Bharmal, Pune (IN); Rohit Ramchandra Deshpande, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 137 days.

(21) Appl. No.: 18/412,748

(22) Filed: Jan. 15, 2024

(65) Prior Publication Data

US 2024/0244735 A1 Jul. 18, 2024

Related U.S. Application Data

(60) Provisional application No. 63/439,220, filed on Jan. 16, 2023.

(51) Int. Cl.
*H05B 47/19* (2020.01)
*H04W 12/06* (2021.01)
*H04W 84/18* (2009.01)

(52) U.S. Cl.
CPC ............ *H05B 47/19* (2020.01); *H04W 12/06* (2013.01); *H04W 84/18* (2013.01)

(58) Field of Classification Search
CPC ..... H05B 47/19; H05B 47/196; H04W 12/06; H04W 84/18
See application file for complete search history.

(56) References Cited

U.S. PATENT DOCUMENTS

| | | | | |
|---|---|---|---|---|
| 11,018,510 B2 | | 5/2021 | Wootton et al. | |
| 2012/0299509 A1* | | 11/2012 | Lee ..................... | H04L 61/5038 |
| | | | | 315/291 |
| 2013/0058051 A1* | | 3/2013 | Casey ..................... | H02G 3/16 |
| | | | | 361/730 |
| 2017/0356639 A1* | | 12/2017 | Taylor ..................... | F21V 25/12 |

(Continued)

OTHER PUBLICATIONS

International Search Report and Written Opinion issued in International Application No. PCT/EP2024/025028, mailed Apr. 24, 2024, 9 pages.

*Primary Examiner* — Vernal U Brown
(74) *Attorney, Agent, or Firm* — Talem IP Law, LLP

(57) ABSTRACT

A wireless light switch includes an explosion-proof enclosure comprising a raised keypad and a controller enclosed by the explosion-proof enclosure and electrically coupled to the raised keypad. The controller is configured to receive a password via the raised keypad, authenticate the password, upon the password being authenticated, connect to a mesh network comprising a plurality of light devices, and after connecting to the mesh network, send a control message to a first light device of the mesh network. In some cases, the control message directs the plurality of light devices to perform a new action that is different from a current action set by a light schedule for the plurality of light devices. In some cases, the mesh network is a secure Bluetooth® mesh network and the controller is further configured to convert Bluetooth® mesh data into Wi-Fi®/ZigBee® data and send the Wi-Fi®/ZigBee® data to a distributed control system wirelessly.

20 Claims, 3 Drawing Sheets

200

210
Receive a password via a raised keypad of the wireless light switch

220
Authenticate the password

230
Upon the password being authenticated, connect to a mesh network that includes a plurality of light devices 240
After connecting to the secure mesh network, send a control message to a first light device of the mesh network

(56)     References Cited

U.S. PATENT DOCUMENTS

| 2021/0144836 | A1* | 5/2021 | Krajnc | H05B 47/155 |
| 2021/0219148 | A1* | 7/2021 | Lee | H04B 1/18 |
| 2021/0335557 | A1* | 10/2021 | Willis | H04W 52/0254 |
| 2022/0083014 | A1* | 3/2022 | Tsai-Fu | H02G 3/12 |
| 2022/0243874 | A1 | 8/2022 | Kraz et al. | |
| 2023/0117118 | A1* | 4/2023 | Wang | H04W 48/08 |
| | | | | 370/254 |

* cited by examiner

200

210
Receive a password via a raised keypad of the wireless light switch

220
Authenticate the password

230
Upon the password being authenticated, connect to a mesh network that includes a plurality of light devices 240
After connecting to the secure mesh network, send a control message to a first light device of the mesh network

WIRELESS LIGHT SWITCH TO CONTROL A MESH NETWORK OF LIGHT DEVICES IN HAZARDOUS ENVIRONMENTS

BACKGROUND

It has become commonplace to utilize "smart lighting" devices in many home and office spaces. These smart lighting devices typically connect to a mobile device via Wi-Fi®, ZigBee®, or Bluetooth® so that users may use their mobile device to control the "smart light" (e.g., turn on/off, adjust brightness, etc.). Traditional Bluetooth® connectivity requires a mobile device to pair to each smart light individually. As a result, if there are five smart lights in an office space, the user must, individually, get the mobile device within proximity to each of the five lights to connect to and gain control of each smart light.

Mesh networks (e.g., a Bluetooth® mesh network) can be used to group individual smart lights to create a single mesh, which can include a number of individual smart lights, allowing the mesh (e.g., a collection of smart lights) to be controlled collectively. This is advantageous in industrial spaces, where there can be hundreds of light devices on a given premises. The mesh may be programmed to an automatic schedule (e.g., lights at full brightness during the day, but half brightness in the evening) to further promote efficiency and convenience on the premises. However, there are several occasions where the lights need to be adjusted from the set lighting schedule, without the need or desire to completely alter or override the schedule in place. These adjustments to a set lighting schedule can be easily accomplished because the user may use their mobile device to connect to a single light (e.g., within proximity of the mobile device) to adjust or alter one or more of the lights.

These complex lighting mesh networks are often used in industrial spaces that are considered hazardous environments. Unfortunately, in most places that are classified as a hazardous environment, mobile device use is heavily restricted, if not outright prohibited. Therefore, because the mobile device is required to be within the proximity of at least one smart light device in the mesh network to alter the lighting schedule, mobile devices are not suitable devices to rely on to control and/or adjust lighting schedules of lighting mesh networks in hazardous environments. The complexity of the lighting mesh network (e.g., quantity and complexity of the scheduling) requires a control device that is more advanced than a traditional wall switch, but much less electrically complex than a mobile device.

As such, there is a need for a device that can control a mesh network of light devices in a hazardous environment while complying with security measures meant to protect the safety of both the hazardous environment and those working within the hazardous environment.

BRIEF SUMMARY

A wireless light switch to control a mesh network of light devices in hazardous environments is described. Advantageously, the wireless light switch is safe for use within hazardous environments, provides the necessary functionality to alter a lighting schedule of lighting devices in a mesh network, and prioritizes security by limiting the control access for the wireless light switch to authorized users (e.g., by requiring a first password to unlock the functionality of the wireless light switch, such as receiving a directive to alter the mesh network, and/or a second password to connect to the mesh network).

A wireless light switch includes an explosion-proof enclosure that includes a raised keypad; and a controller enclosed by the explosion-proof enclosure and electronically coupled to the raised keypad. The controller is configured to receive a password via the raised keypad, authenticate the password, upon the password being authenticated, connect to a mesh network that includes a plurality of light devices, and after connecting to the mesh network, send a control message to a first light device of the mesh network. The control message is retransmitted across the entirety of the plurality of light devices of the mesh network until each of the light devices of the plurality of light devices of the mesh network has received the control message.

The controller is further configured to receive a directive to control the plurality of light devices from a user via the raised keypad. In some cases, the control message directs the plurality of light devices to perform a new action that is different from a current action set by a light schedule for the plurality of light devices. In some cases, the control message specifies a time period for the plurality of light devices to perform the new action. In some cases, the control message directs the plurality of light devices of the mesh network to change a brightness of the plurality of light devices.

In some cases, the wireless light switch further includes a battery enclosed by the explosion-proof enclosure and electrically coupled to the controller. In some cases, the raised keypad is alpha-numeric. In some cases, the raised keypad includes a time-synch button configured to synchronize a time of the plurality of lights with a time recorded by the wireless light switch. In some cases, the mesh network is a secure Bluetooth® mesh network, and the controller is further configured to convert Bluetooth® mesh data into Wi-Fi® data or ZigBee® data and send the Wi-Fi® data or the ZigBee® data to a distributed control system.

In some cases, the step of receiving the password via the raised keypad includes receiving a first password to unlock functionality of the wireless light switch and a second password to connect to the mesh network and the step of authenticating the password includes authenticating the first password and authenticating the second password. In some cases, the wireless light switch is intrinsically safe.

In some cases, the mesh network is a secure Bluetooth® mesh network. In some cases, the mesh network is a secure Wi-Fi® mesh network. In some cases, the mesh network is a secure ZigBee® mesh network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
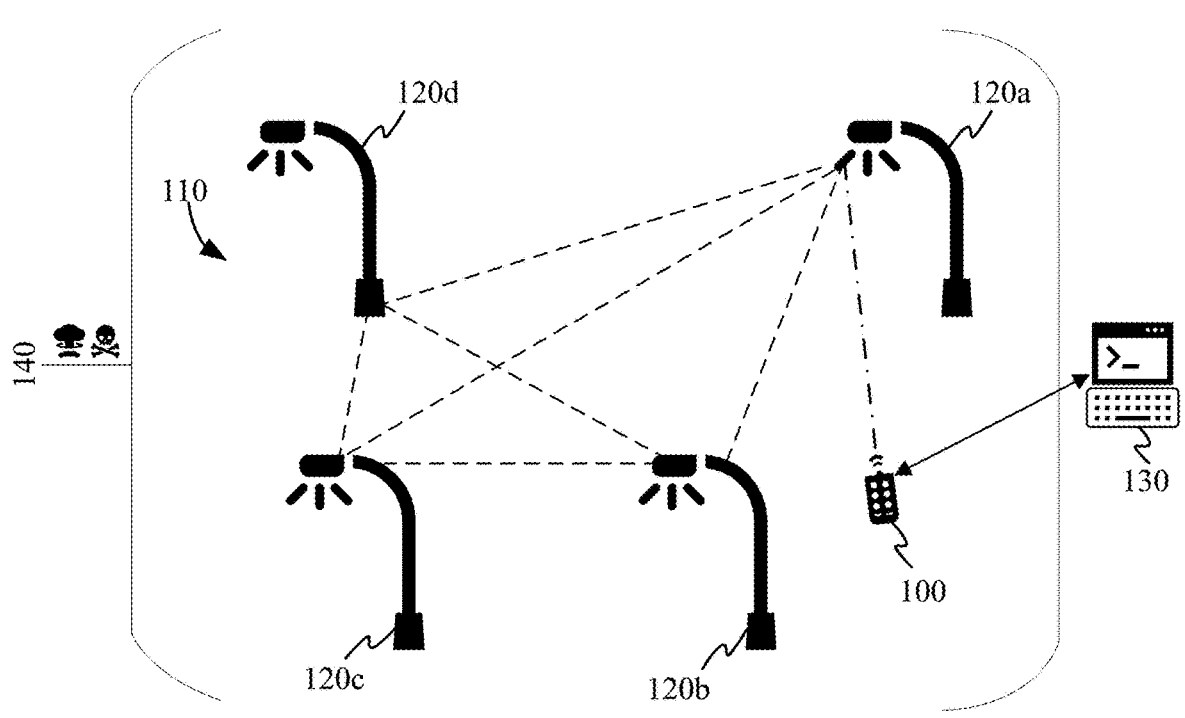
FIG. 1A illustrates an example operating environment for a wireless light switch and a mesh network of light devices.

A wireless light switch to control a mesh network of light devices in hazardous environments is described. Advantageously, the wireless light switch is safe for use within hazardous environments, provides the necessary functionality to alter a lighting schedule of lighting devices in a mesh network, and prioritizes security by limiting the control access for the wireless light switch to authorized users (e.g., by requiring a first password to unlock the functionality of the wireless light switch, such as receiving a directive to alter the mesh network, and/or a second password to connect to the mesh network).

As discussed herein, because the use of mobile devices is restricted or prohibited in hazardous environments, there is a need for a device that is permitted for use in hazardous environments that can communicate with and control light devices on a Bluetooth® Low Energy (BLE) mesh network. One benefit of controlling a mesh network of light devices with a mobile device is the increased security and control, in comparison to using a standard wall switch that anyone in the facility could access. In many of these industrial spaces that can be considered hazardous environments, because of the dangerous nature of the environment, the safety of both the employees and the facility is a top priority. If these hazardous environment facilities simply relied on a wall switch to control the mesh network of lights devices, the entire mesh network of lights could easily be accessed by anyone, either purposefully or by accident. For example, an employee could unknowingly flip a wall switch that controls a mesh of lighting devices, turning off every light device belonging to that mesh. There are many facilities with hazardous environments where a sudden shift from bright lighting to complete darkness could be extremely dangerous. Indeed, in many facilities with hazardous environments, when light devices on a mesh network are set to a specific lighting schedule, an unexpected or unauthorized disruption of the lighting schedule may pose large safety and/or security concerns.

Advantageously, the wireless light switch discussed herein includes security features to ensure that the mesh network of light devices is controlled by authorized personnel. It should be understood that although the functionality of the wireless light switch is described with respect to controlling light devices, the functionality of the wireless switch may be used for controlling any type of mesh devices (e.g., non-lighting devices such as Bluetooth® speakers) and still remain within the scope of the invention described herein.

In some cases, the wireless light switch is "intrinsically safe." As used herein, "intrinsically safe" means incapable of releasing enough electrical or thermal energy under normal or abnormal conditions to cause ignition of a flammable mixture of methane or natural gas and air of the most easily ignitable composition. In some cases, individual components (e.g., circuits and/or batteries) of the wireless light switch are intrinsically safe. For example, a battery box cover can be secured in a closed position. In some cases, each wire or cable in the wireless light switch can have short-circuit protection in an explosion-proof enclosure located over battery terminals.

In some cases, components that affect intrinsic safety in the wireless light switch (if these components are included in the wireless light switch) meet the following requirements: (i) Current limiting components shall consist of two equivalent devices each of which singly will provide intrinsic safety. They shall not be operated at more than 50 percent of their ratings. (ii) Semiconductors shall be amply sized. Rectifiers and transistors shall be operated at not more than two-thirds of their rated current and permissible peak inverse voltage. Zener diodes shall be operated at not more than one-half of their rated current and shall short under abnormal conditions. (iii) Electrolytic capacitors shall be operated at not more than two-thirds of their rated voltage.

FIG. 1A illustrates an example operating environment for a wireless light switch and a mesh network of light devices. Referring to FIG. 1A, an example operating environment may include a wireless light switch 100, mesh network 110 of light devices 120 (e.g., first light device 120a, second light device 120b, third light device 120c, and fourth light device 120d, and so on), and a distributed control system (DCS) 130. In some cases, the light devices 120 are located in hazardous environment area 140. In some cases, hazardous environment area 140 is an environment with atmospheres containing flammable gases or vapours and/or combustible dusts. In some cases, hazardous environment area 140 is an environment that requires the use of specific, approved equipment to limit the risk of the equipment creating an ignition-capable spark or a thermal energy ignition (e.g., intrinsically safe equipment). In some cases, the wireless light switch 100 is safe to use in hazardous environment area 140. In some cases, the wireless light switch 100 is intrinsically safe.

The wireless light switch 100 is configured to communicate with and control the light devices 120 on the mesh network 110. In some cases, the mesh network 110 uses computer mesh networking standard based on Bluetooth® Low Energy (BLE) that allows for many-to-many communication over Bluetooth® radio. In some cases, the mesh network 110 is a secure BLE mesh network. In some cases, the mesh network 110 uses computer mesh networking standard based on Wi-Fi®. In some cases, the mesh network 110 uses computer mesh networking standard based on ZigBee®. In some cases, to create the mesh network 110 of light devices 120, the mesh network 110 uses a mesh networking standard that operates on a flood network principle.

Each of the light devices 120 is considered a node on the mesh network 110. The wireless light switch 100 sends a control message to at least one of the light devices 120. The control message directs the light devices 120 to perform an action (e.g., to change the brightness level of that light device). In some cases, when one light device of the light devices 120 (e.g., first light device 120a) of the mesh network 110 receives a control message from the wireless light switch 100, the light devices 120 of the mesh network 110 will forward/retransmit the control message to the other light devices of light devices 120 until all of the light devices 120 on the mesh network 110 have received the control message. Advantageously, the mesh network 110 configuration of light devices 120 allows a user to alter the state of all of the light devices 120 located in the hazardous environment area 140 using the wireless light switch 100—without the need for a mobile device.

In some cases, the mesh network 110 of light devices 120 is set on a schedule. The set schedule may schedule the light devices 120 to be on/off, change brightness, and/or change the color of the lights of the light devices 120 at specific times and/or under specific circumstances based on preference of a user. In some cases, the wireless light switch 100 sends a control message to direct the mesh network 110 of light devices 120 to perform an action that diverges from the set schedule.

For example, the mesh network 110 of light devices 120 may be on a schedule that directs all of the light devices 120 in the mesh network 110 to turn to 80% brightness between the hours of 7:00 AM and 7:00 PM and directs all of the light devices 120 to turn to 30% brightness between 7:01 PM to 6:59 AM. In some cases, a user may wish to change the current state of the light devices 120 from the set schedule. For example, on a particular day at 8:00 PM, a user (e.g., maintenance worker performing maintenance during off-hours) may wish to adjust the lighting to be brighter than the 30% brightness set by the schedule.

Fortunately, because the light devices 120 are on the mesh network 110, each light does not need to be adjusted individually. However, because the light devices 120 are in hazardous environment area 140, the user cannot rely on a prohibited mobile device or similar electronic computing device that would normally control devices on a mesh network.

Advantageously, a user may control the light devices 120 via wireless light switch 100. In some cases, wireless light switch 100 sends a control message to a light device of the light devices 120 of the mesh network 110. This control message is relayed throughout the light devices 120 (e.g., via BLE protocol) until each of the light devices 120 of the mesh network 110 has received the control message.

In some cases, the wireless light switch 100 can send the control message to any of the light devices 120 to instruct the mesh network 110 of light devices 120 to perform the action specified by the control message. In some cases, each of the light devices 120 on the mesh network 110 receives and forwards/retransmits the control message until all of the light devices 120 have received the control message.

In some cases, the wireless light switch 100 sends a control message to the first light device 120*a*. In some cases, each of the light devices 120 on the mesh network 110 are connected to one another. In some cases, any light device of the light devices 120 that receives the control message (e.g., first light device 120*a* in FIG. 1A) can forward/retransmit the control message (e.g., via BLE protocol) to a different light of the light devices 120 on the mesh network 110.

For example, in some cases, the wireless light switch 100 sends a control message to the first light device 120*a*. After the first light device 120*a* receives the mesh control message, the first light device 120*a* forwards/retransmits the control message to any of the other light devices of light devices 120 (e.g., second light device 120*b*, and/or fourth light device 120*d*). In some cases, the first light device 120*a* forwards/retransmits the control message to the second light device 120*b*. Once the second light device 120*b* receives the mesh control message, the second light device 120*b* may forward/retransmit the control message to third light device 120*c*. In some cases, this process is continued until all of the light devices 120 on the mesh network 110 have received the control message.

The wireless light switch 100 is further configured to communicate with the DCS 130 (e.g., via BLE protocol. Wi-Fi®, and/or ZigBee®). In some cases, the DCS 130 is not located in the hazardous environment area 140. In some cases, the DCS 130 is a computing device (e.g., mobile device, computer, etc.). In some cases, the wireless light switch 100 communicates with the DCS 130 wirelessly. In some cases, the wireless light switch 100 communicates with the DCS 130 via a wired connection (e.g., ethernet). In some cases, the wireless light switch 100 transmits a signal from one protocol (e.g., BLE of the mesh network 110) to a different protocol (e.g., Wi-Fi® or ZigBee® of the DCS 130). In some cases, the wireless light switch 100 converts mesh data to data of a different protocol (e.g., Wi-Fi® data and/or ZigBee® data) and sends the converted data to the DCS 130. In this way, the wireless light switch 100 may act as a bridge between a first protocol (e.g., BLE) and a variety of other protocols (e.g., Wi-Fi® and/or ZigBee®) of the DCS 130. Examples of protocols for the DCS 130 may include, but are not limited to, Wi-Fi®, WHART, LORa, and ZIGBEE. In some cases, the wireless light switch 100 can convert BLE data into a single different protocol. In some cases, the wireless light switch 100 can convert BLE data into several different protocols.

Figure 1B:
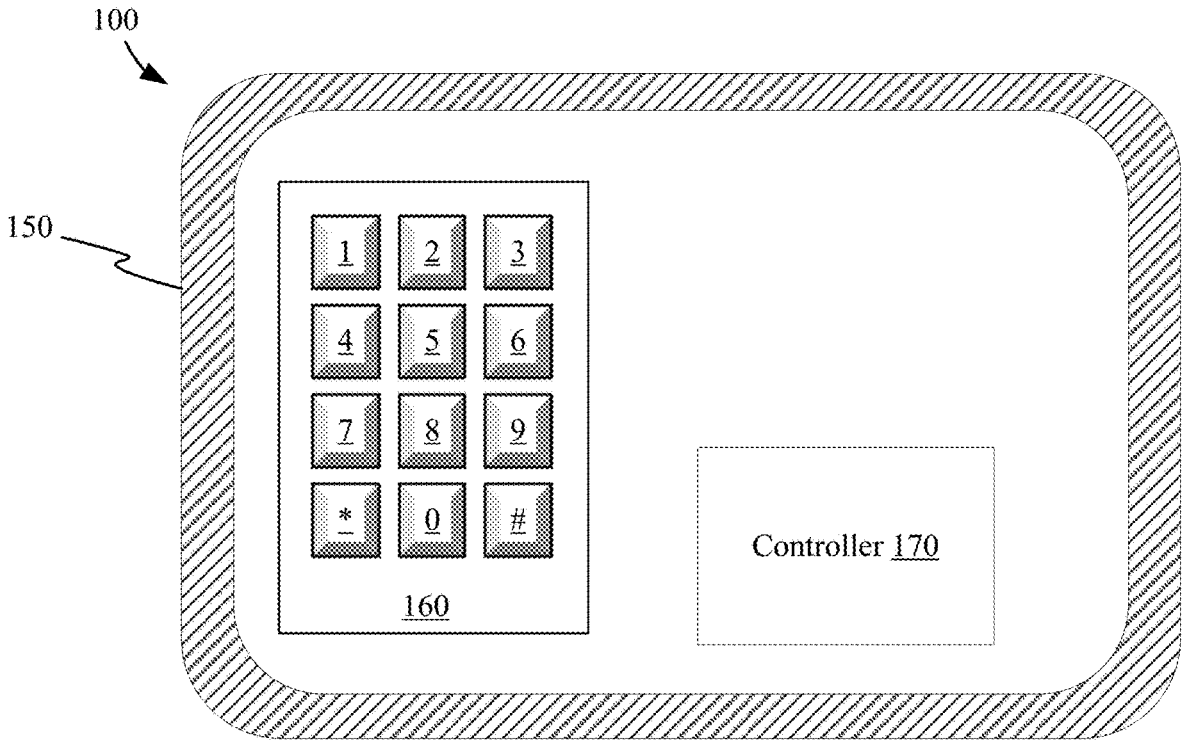
FIG. 1B illustrates an example embodiment of a wireless light switch.

FIG. 1B illustrates an embodiment of a wireless light switch. The wireless light switch 100 includes an explosion-proof enclosure 150, a raised keypad 160, and a controller 170. Referring to FIGS. 1A and 1B, the wireless light switch 100 can control the functionality of the mesh network 110 of light devices 120. The wireless light switch 100 facilitates user interaction with a mesh network 110 of light devices 120, such that a user need not rely on a mobile device to control the light devices 120.

Referring to FIG. 1B, the wireless light switch 100 includes a raised keypad 160 and controller 170. The raised keypad 160 is electrically coupled to the controller 170. The controller 170 is enclosed by the explosion-proof enclosure 150. The explosion-proof enclosure 150 may include the raised keypad 160. In some cases, the raised keypad 160 is formed within an aperture in the explosion-proof enclosure 150.

The raised keypad 160 can receive input from a user. The controller 170 can receive a password and/or determine a directive (e.g., to turn lights on or off and/or change a brightness of the lights) from the received input at the raised keypad 160. In some cases, the raised keypad 160 is a numeric keypad containing a key for each of the numbers 0-9. *, and #. For example, in some cases, a user may press the "6" key and "0" key of the raised keypad 160 to turn the light devices 120 on the mesh network 110 to 60% brightness. In some cases, the raised keypad 160 is an alphanumeric keypad. In some cases, the raised keypad 160 is not a virtual keypad on a touchscreen.

In some cases, the raised keypad 160 includes additional buttons that, when selected, cause the controller 170 to direct the light devices 120 on the mesh network 110 to perform specific, predefined functions. In some cases, the raised keypad includes an "On/Off" button. In some cases, the raised keypad 160 includes a "revert" button. The "revert" button may be used to cause the controller 170 to direct the light devices 120 of the mesh network 110 to revert back to a set schedule. For example, if the light devices 120 on the mesh network 110 were set to a schedule that had the light devices 120 at 30% brightness and a user changed that brightness to 90% with the wireless light switch 100, selecting the "revert" button would cause the controller to direct the light devices 120 to revert back to compliance with the set schedule (i.e. 30% brightness). In some cases, the mesh network 110 of light devices 120 will revert back to the set schedule automatically after a predefined time period (e.g., one hour).

In some cases, the raised keypad 160 includes a "synchronize" button. In some cases, the controller 170 includes a network-time synch feature to alter the time-synch data of the wireless light switch 100 to the light devices 120 on the mesh network 110. In some cases, the network-time synch feature receives time data via Wi-Fi®. In some cases, the network-time synch feature receives time data via an ethernet connection. In some cases, the network-time synch feature receives time data via a real-time clock (RTC) with a power backup in the controller 170. Advantageously, if there were a power outage in hazardous environment area 140 that resulted in a loss of power to the light devices 120, upon the return of power to the light devices 120, the "synchronize" button can be utilized to cause the controller to direct the light devices 120 to synchronize the time of the light devices 120 on the mesh network 110 to the time data of the controller 170.

In some cases, the wireless light switch 100 includes plug-in capabilities (e.g., an Ethernet port) to connect to the mesh network 110. In some cases, the wireless light switch 100 is battery operated. In some cases, the battery is enclosed by the explosion-proof enclosure and electrically coupled to the controller. In some cases, the wireless light switch 100 does not include plug-in capabilities. In some cases, the wireless light switch 100 includes an antenna to facilitate communication with the light devices 120 on the mesh network 110. In some cases, the controller 170 can adjust the wireless signal antenna strength of the wireless light switch 100. For example, the controller 170 can adjust the transmitted signal strength indicator (TSSI) and received signal strength indicator (RSSI) values of the wireless light switch 100.

The explosion-proof enclosure 150 of wireless light switch 100 protects the controller 170 and other electrical components of the wireless light switch 100 housed within the explosion-proof enclosure 150 of the wireless light switch 100 from damage and, in some cases, prevents exposure to the surrounding environment. In some cases, the explosion-proof enclosure 150 is an explosion-proof box. In some cases, the explosion-proof enclosure 150 is spark-proof. In some cases, the explosion-proof enclosure 150 is non-metallic.

In some cases, the explosion-proof enclosure 150 is an enclosure designed and constructed to withstand internal explosions of flammable mixtures without damage or excessive distortion to its walls, cover(s), or flame-path joints; and without ignition of methane-air mixtures and/or other ignitable mixtures that may be present in the hazardous environment surrounding the explosion-proof enclosures. In some cases, the explosion-proof enclosure 150 is a flame-proof container that limits a potential explosion to inside the container, so that any potential flame and/or spark does not propagate to the surrounding environment. In some cases, the explosion-proof enclosure 150 complies with the Mine Safety and Health Administration (MSHA) and/or other applicable regulatory agency design and construction requirements for explosion-proof enclosures. In some cases, the explosion-proof enclosure 150 complies with the International Electrotechnical Commission (IEC) standards of explosion-proof and/or flame-proof enclosures.

In some cases, the wireless light switch 100 includes leakage protection. In some cases, the wireless light switch 100 includes a short circuit and/or other hardware protection circuits. In some cases, the wireless light switch 100 includes an intrinsically safe circuit. In some cases, the wireless light switch is low voltage (up to and including 660 volts). In some cases, the wireless light switch 100 itself is intrinsically safe.

Figure 2:
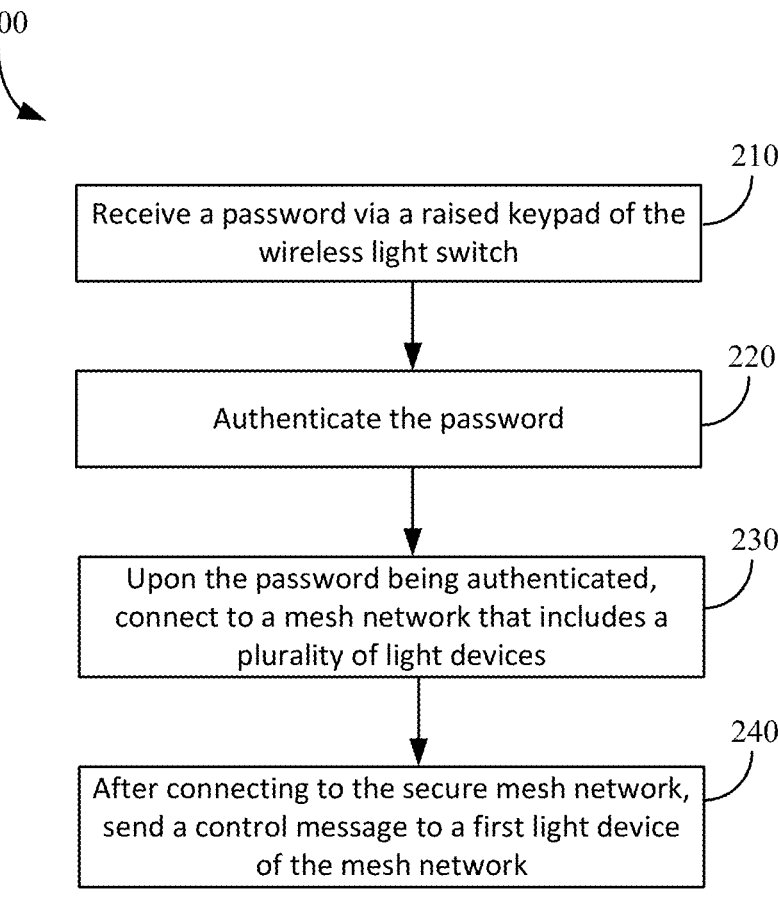
FIG. 2 illustrates a process flow for directing light devices on a BLE mesh network via a wireless light switch.

| FIG. 2 illustrates a process flow for directing light devices on a BLE mesh network via a wireless light switch. Referring to FIG. 2, a process 200 for directing light devices on a mesh network via a wireless light switch includes receiving (210) a password via the raised keypad (e.g., as described above) and authenticating (220) the password. In some cases, authenticating (220) the password includes matching the received password with a predetermined password stored locally on the wireless light switch. For example, the predetermined password may be stored in storage accessible to a controller of the wireless light switch and the controller may authenticate the received password by matching the received password with the predetermined password retrieved from the storage. In some cases, authenticating (220) the received password includes sending the received password to a DCS; and then receiving confirmation that the received password is authenticated from the DCS (e.g., the received password is matched with a password stored in storage at the DCS). In some cases, authenticating (220) the received password includes sending the received password to a device (e.g., light device) in the mesh network; and then receiving confirmation that the received password is authenticated from the device in the mesh network (e.g., the received password is matched with a password stored in storage at the mesh network).

In some cases, two passwords may be received (210) and authenticated (220). In some cases, the two passwords are received (210) and authenticated (220) concurrently. In some cases, the two passwords are received (210) and authenticated (220) separately. For example, a first password may be required to unlock the functionality of the wireless light switch and a second password may be required to connect to the mesh network. The first password and/or the second password may be required each time the wireless light switch is used to provide a directive, after a predefined time period since the last time the password was used, after an event (e.g., loss of power), and/or the first time the password is used. For example, the first password may be required every hour during use (e.g., after receiving (210) and authenticating (220) the first password, the wireless light switch can only send mesh control messages to the light devices of the mesh network for sixty minutes) and the second password may be required only the first time the second password is used.

Advantageously, receiving (210) and authenticating (220) the first password improves security of the mesh network prevents unauthorized users and/or accidental use of the wireless light switch from interacting with the mesh network. Advantageously, receiving (210) and authenticating (220) the second password improves security of the mesh network prevents outside devices (such as other devices with mesh connectivity) from interacting with the mesh network. Indeed, the use of the first and/or second password provides two levels of security that protect the mesh network of light devices from breach or tampering. In some cases, the wireless light switch will not operate until the wireless light switch receives (210) and authenticates (220) a password. In some cases, the password is numerical. In some cases, the secure password is alphanumerical.

The process 200 further includes connecting (230) to a mesh network including a plurality of light devices and sending (240) a control message to a first light device of the mesh network after connecting to the mesh network. In some cases, the connecting (230) occurs upon the first password and/or the second password (e.g., as described above) being authenticated. In some cases, the mesh network can be mesh network 110 as described with respect to FIGS. 1A and 1B.

In some cases, the wireless light switch is connected (230) to the mesh network via provisioning. In some cases, the wireless light switch cannot send a control message to any device on the mesh network without first connecting to the mesh network.

In some cases, the wireless light switch receives a directive from a user to control the plurality of light devices on the mesh network. In some cases, the directive is instructions for the plurality of light devices to perform an action. In some cases, the directive is received via a keypad of the wireless light switch. As discussed in FIG. 1B, in some cases, the keypad of the wireless light switch includes a numeric and/or alphanumeric keypad. In some cases, the keypad of the wireless light switch includes buttons with predefined functions.

In some cases, the directive from a user to control the plurality of light devices on the mesh network directs a controller to send (240) a control message to a first light device of the plurality of light devices of the mesh network to adjust the brightness of the plurality of light devices. In some cases, the directive from a user to control the plurality of light devices on the mesh network directs a controller to send (240) a control message to a first light device of the plurality of light devices of the mesh network to turn on/off. In some cases, the directive from a user to control the plurality of light devices on the mesh network directs a controller to send (240) a control message to a first light device of the plurality of light devices of the mesh network to change color. As explained above, the control message can then be forwarded/transmitted to other light devices of the plurality of light devices of the mesh network.

Figure 3:
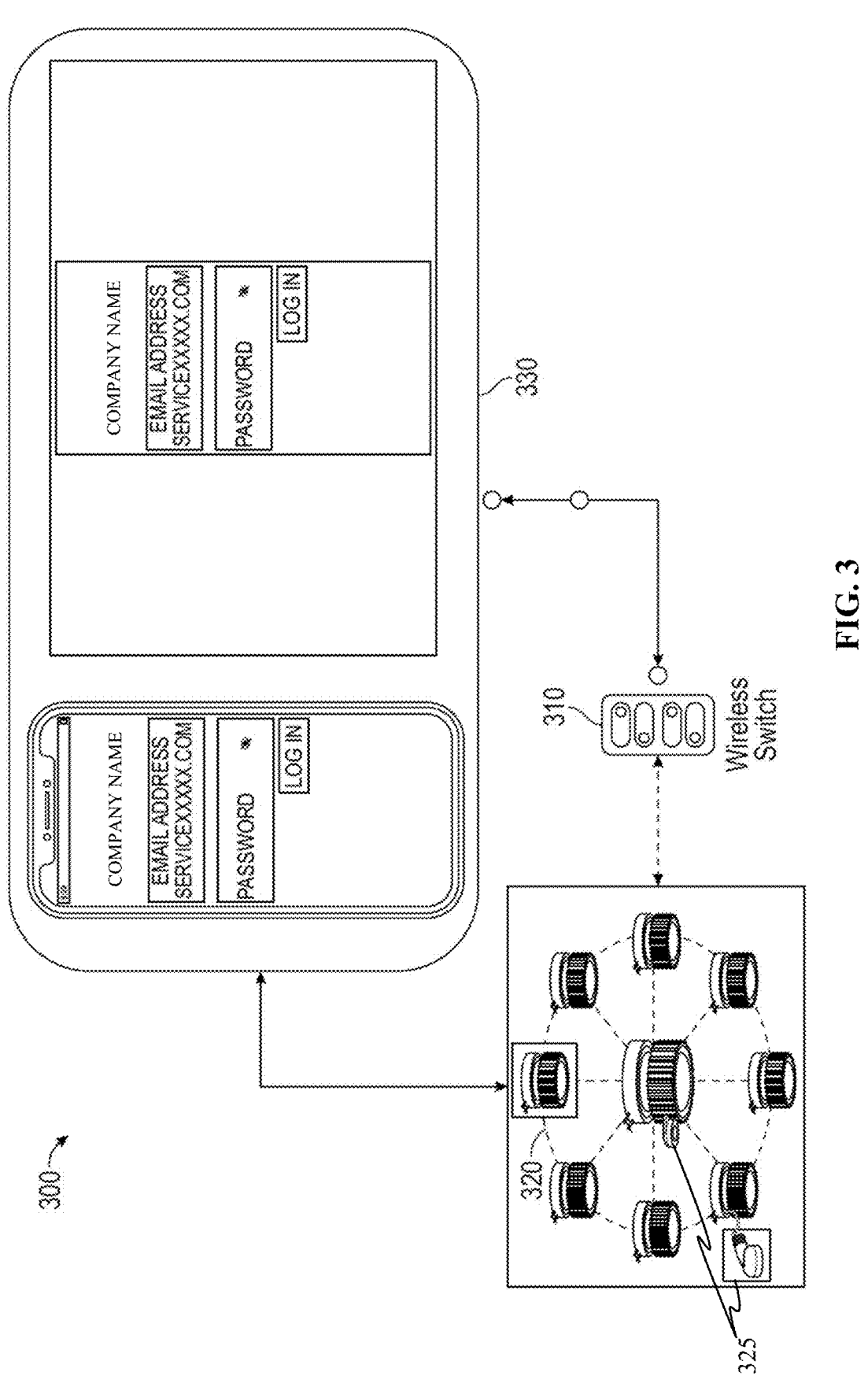
FIG. 3 illustrates an operating environment for a wireless light switch.

FIG. 3 illustrates an operating environment for a wireless light switch. Referring to FIG. 3, the operating environment 300 includes a wireless light switch 310, a plurality of light devices of a mesh network 320, and a computing device 330 (e.g., a DCS). The wireless light switch 310 may be the wireless light switch 100 of FIGS. 1A and 1B. The plurality of light devices of the mesh network 320 may include the light devices 120 on the mesh network 110 of FIGS. 1A and 1B.

The wireless light switch 310 can send one or more control messages to the plurality of light devices of the mesh network 320. As described in more detail in FIG. 1A (e.g., with respect to light devices 120 and the mesh network 110), each of the plurality of light devices of the mesh network 320 are connected to one another across a mesh network. As such, when one light device of the plurality of light devices of the mesh network 320 receives a control message from the wireless light switch 310, the control message is forwarded/retransmitted across the entirety of the plurality of light devices of the mesh network 320 until each of the light devices of the plurality of light devices of the mesh network 320 has received the control message.

In some cases, the wireless light switch 310 sends one or more control messages to the plurality of light devices of the mesh network 320 using Bluetooth® Low Energy mesh networking protocol. In some cases, the plurality of light devices of the mesh network 320 may each include a chip 325 that includes a wireless interface and processor. In some cases, chip 325 is a Bluetooth® mesh sensor that receives the control message from the wireless light switch 310.

The wireless light switch 310 can send messages (e.g., containing one or more passwords for authentication and/or control messages that are also sent to the plurality of light devices of the mesh network 320) to the computing device 330. In some cases, the computing device 330 is a mobile phone. In some cases, the computing device 330 is a computer. In some cases, the computing device 330 is the DCS 130 of FIG. 1A.

To ensure safety and keep the wireless light switch 310 safe for hazardous areas, in some cases, the electrical components of the wireless light switch 310 are limited. As such, there may be a need to rely on more complex devices, such as computing device 330, to configure certain features of the wireless light switch 310. In some cases, a user interacts with a graphical user interface (GUI) of the computing device 330 to configure settings for the wireless light switch 310. For example, a user may adjust the wireless signal antenna strength of the wireless light switch 310 via the computing device 330. In some cases, in order to connect the wireless light switch 310 to the plurality of light devices of the mesh network 320 (e.g., the connect (230) step of FIG. 2), a user may interact with the GUI of computing device 330 to facilitate a secure connection of the wireless light switch 310 to the plurality of light devices of the mesh network 320. For example, a user may set a secure password for the wireless light switch 310 via the computing device 330. In some cases, a user may log into a network account of an entity (e.g., specific user and/or business entity) via the GUI of the computing device 330 to configure certain features of the wireless light switch 310.

In some cases, a user may use the GUI of the computing device 330 to communicate with the plurality of light devices of the mesh network 320 via the wireless light switch 310. In some cases, a user may set a schedule for the plurality of light devices of the mesh network 320 on the GUI of the computing device 330 via the wireless light switch 310.

In some cases, the wireless light switch 310 sends mesh data to the computing device 330. In some cases, the computing device 330 is not configured to receive mesh data. In some cases, and as described in more detail in FIG. 1A, the wireless light switch 310 can convert mesh data into data of other protocols (e.g., Wi-Fi®, WHART, LORa, and ZIGBEE) prior to sending data to the computing device 330.

In some cases, the wireless light switch 310 communicates with the computing device 330 wirelessly. In some cases, the wireless light switch 310 can send data to the computing device 330 via a wired (e.g., Ethernet) connection.

The controller (e.g., controller 170 of FIG. 1B) of the wireless light switch can include a processor, storage, and input/output interface(s), which can include a user input interface (e.g., to couple to a raised keypad and/or additional button interface(s)) and a communications interface that couples to or includes a communications system. Components of the controller can be coupled, for example, via a system bus and other on chip and on board interconnects. The processor can include one or more of any suitable processing devices ("processors"), such as a microprocessor, central processing unit (CPU), field programmable gate arrays (FPGAs), application-specific integrated circuits (ASICs), logic circuits, and state machines. Storage can include any suitable storage media that can store instructions (e.g., to carry out process 200 of FIG. 2) and/or passwords for controlling operation of the wireless light switch. The instructions stored on the storage are executed by the processor to carry out control operations for the mesh network.

As used herein "storage media" do not consist of transitory, propagating waves. Instead, "storage media" refers to non-transitory media. The communications system can include a network interface for coupling to the Internet or cellular service (e.g., for communicating with a service tied to a computing device or with the mesh network) and/or a short-range interface (near field, wide band, BLE, ZigBee®, and/or other common communication protocols) that can be used to communicate wirelessly with nearby devices (e.g., including the computing device and the mesh network. In some cases, sensors included in the mesh network may also be in communication with the wireless light switch via an interface associated with the communications system or via direct interfaces for those sensors (or general interfaces such as USB or firewire).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A wireless light switch, comprising:
an explosion-proof enclosure comprising a raised keypad; and
a controller enclosed by the explosion-proof enclosure and electrically coupled to the raised keypad, wherein the controller is configured to:
receive a password via the raised keypad;
authenticate the password;
upon the password being authenticated, connect to a mesh network comprising a plurality of light devices; and
after connecting to the mesh network, send a control message to a first light device of the mesh network, wherein the control message is retransmitted across the entirety of the plurality of light devices of the mesh network until each of the light devices of the plurality of light devices of the mesh network has received the control message.

2. The wireless light switch of claim 1, wherein the controller is further configured to receive a directive to control the plurality of light devices from a user via the raised keypad.

3. The wireless light switch of claim 1, wherein the control message directs the plurality of light devices to perform a new action that is different from a current action set by a light schedule for the plurality of light devices.

4. The wireless light switch of claim 3, wherein the control message specifies a time period for the plurality of light devices to perform the new action.

5. The wireless light switch of claim 3, wherein the control message directs the plurality of light devices of the mesh network to change a brightness of the plurality of light devices.

6. The wireless light switch of claim 1, further comprising a battery enclosed by the explosion-proof enclosure and electrically coupled to the controller.

7. The wireless light switch of claim 1, wherein the raised keypad is alpha-numeric.

8. The wireless light switch of claim 1, wherein the raised keypad comprises a time-synch button configured to synchronize a time of the plurality of light devices with a time recorded by the wireless light switch.

9. The wireless light switch of claim 1, wherein the mesh network is a secure Bluetooth® mesh network, wherein the controller is further configured to:
convert Bluetooth® mesh data into Wi-Fi® data or Zig-Bee® data; and
send the Wi-Fi® data or the ZigBee® data to a distributed control system wirelessly.

10. The wireless light switch of claim 1, further comprising a wireless antenna, wherein the controller is further configured to adjust a signal strength of the wireless signal antenna.

11. The wireless light switch of claim 1, wherein the step of receive the password via the raised keypad comprises receive a first password to unlock functionality of the wireless light switch and a second password to connect to the mesh network; and wherein the step of authenticate the password comprises authenticate the first password and authenticate the second password.

12. The wireless light switch of claim 1, wherein the wireless light switch is intrinsically safe.

13. The wireless light switch of claim 1, wherein the mesh network is a secure Bluetooth® mesh network.

14. The wireless light switch of claim 1, wherein the mesh network is a secure Wi-Fi® mesh network.

15. The wireless light switch of claim 1, wherein the controller is further configured to:
receive a first password entered via the raised keypad to enable operation of the light switch, and
receive a second password to authenticate network access to the mesh network, the controller being configured to propagate a control message across the mesh network only after successful authentication of the second password.

16. The wireless light switch of claim 1, wherein the explosion-proof enclosure is sealed to prevent ignition of surrounding flammable gases or vapors, and wherein the controller, responsive to authentication of the password, electronically unseals the light switch by enabling operation of power-control circuitry within the enclosure while maintaining the sealed, intrinsically-safe condition of the enclosure.

17. An intrinsically-safe wireless control apparatus for hazardous environments, comprising:
an explosion-proof enclosure housing control electronics and a raised keypad, the enclosure being sealed to prevent ignition of surrounding flammable gases or vapors;
a controller within the enclosure configured to receive, via the raised keypad, a password entered by an authorized user; and
wherein the controller, upon verification of the password, electronically unseals the apparatus by enabling operation of power-control circuitry within the enclosure while maintaining the sealed, intrinsically-safe condition of the enclosure,
enables wireless communication with one or more external devices; and
establishes wireless communication with one or more external devices in response to the verification.

18. The intrinsically-safe wireless control apparatus of claim 17, wherein the controller is further configured to:
receive a first password entered via the raised keypad to unseal the power-control circuitry;
receive a second password to authenticate network access for the wireless communication with the one or more external devices; and
upon verification of the second password, propagate a control message through the wireless communication with the external devices.

19. A wireless control apparatus for hazardous environments, comprising:
an explosion-proof enclosure housing control electronics and a raised keypad;
a controller within the enclosure configured to receive a first password entered via the raised keypad to enable operation of the apparatus;
the controller further configured to receive a second password to authenticate network access to a wireless mesh network comprising a plurality of external devices; and wherein the controller is configured to propagate a control message across the wireless mesh network only after successful authentication of the second password.

20. The apparatus of claim 19, wherein the explosion-proof enclosure is sealed to prevent ignition of surrounding flammable gases or vapors, and the controller is configured, upon authentication of the first password, to enable operation of power-control circuitry within the enclosure while maintaining the sealed, intrinsically-safe condition of the enclosure.

\* \* \* \* \*